S. A. DUDLEY.
HAND THREADING SHUTTLE.
APPLICATION FILED OCT. 17, 1912.
1,122,880.
Patented Dec. 29, 1914.
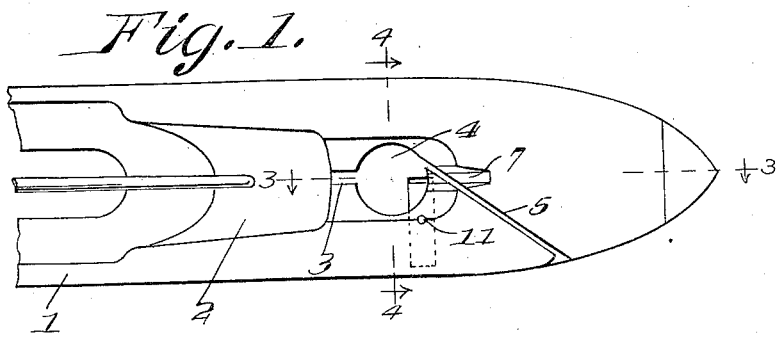
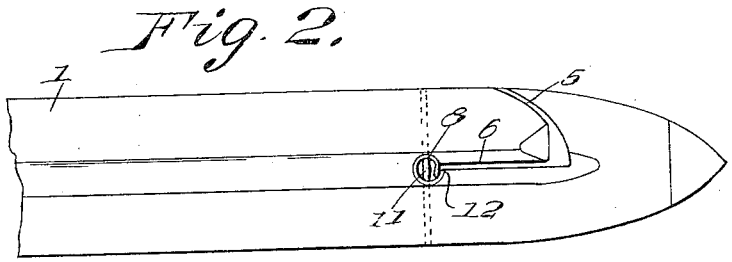
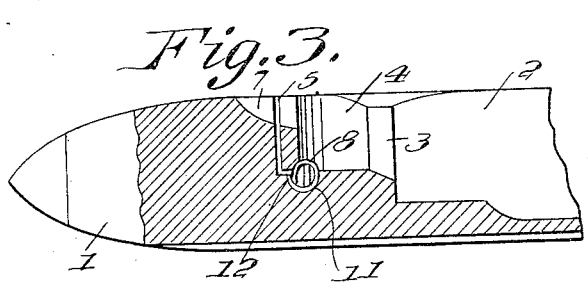
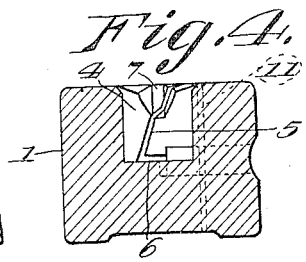
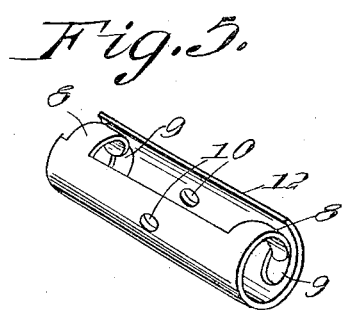
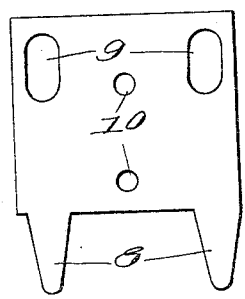

UNITED STATES PATENT OFFICE.

SUMNER A. DUDLEY, OF TAUNTON, MASSACHUSETTS.

HAND-THREADING SHUTTLE.

1,122,880.   Specification of Letters Patent.   Patented Dec. 29, 1914.

Application filed October 17, 1912. Serial No. 726,276.

*To all whom it may concern:*

Be it known that I, SUMNER A. DUDLEY, a citizen of the United States, residing at Taunton, in the county of Bristol and State of Massachusetts, have invented a new and useful Improvement in Hand-Threading Shuttles, of which the following is a specification.

This invention relates to certain new and useful improvements in hand threading shuttles, and the object thereof is to provide a novel, simplified and improved structure whereby the shuttle may be easily and quickly threaded and the thread positively secured against accidental disengagement.

In the drawings—Figure 1 is a fragmentary top plan view of a shuttle constructed in accordance with the invention. Fig. 2 is a similar side elevation. Fig. 3 is a section on the line 3—3 of Fig. 1. Fig. 4 is a section on the line 4—4 of Fig. 1. Fig. 5 is a perspective view of the metal eye, and Fig. 6 is a plan view of the blank from which the eye is constructed.

The shuttle body 1 has the usual throat 2 which communicates by means of a passage 3 with a circular chamber 4. Chamber 4 has one end of the diagonal threading slot 5 leading thereto, the opposite end of which slot communicates with a horizontal saw slit 6 which latter leads to the delivery eye. The top face of the shuttle is grooved at 7 in order to facilitate the introduction of the thread into the slot 5, the groove 7 traversing the slot as depicted in Figs. 1 and 3.

The delivery eye is formed of a blank shown in Fig. 6 which when rolled or bent into the cylindrical or tubular form shown in Fig. 5 has curved spaced end fingers 8 the tips of which extend opposite to and partly in openings 9 that are formed in the blank, the fingers being spaced from the interior surface of the eye body so as to leave thread passages. The eye body is further formed with diametrically opposed perforations 10 which receive a pin 11 that is secured in the shuttle body and acts to hold the eye in position. The pin 11 is disposed between the fingers 8 and engages with the thread in its passage through the eye. The edge 12 of the side of the eye is spaced from the opposite side and extends substantially flush with the wall formed by the horizontal saw slit as depicted in Figs. 2 and 3.

In operation, the thread is placed in groove 7 and drawn down through the slot 5 and then along slit 6 and through the passages formed by the body interior and the fingers 8, where it will be engaged by the pin 11. Since there are two fingers, one at each end of the eye, it will be apparent that the thread will be effectively held against accidental disengagement and in addition the finger tips extend below the slit 6 which further insures against the thread leaving said slit. The fingers by being curved allow the thread to ride easily down the same to enter the eye and by reason of their tips partly projecting in openings 9, the thread will be held against any tendency to move under the tips.

Having thus described my invention, I claim as new and desire to secure by Letters Patent:—

In a shuttle having a threading slot and a substantially horizontal slit leading therefrom, a horizontal delivery eye of cylindrical form having each its ends completely open and having one of its longitudinal side edges extending flush with the bottom wall of the slit, the other side edge having a finger at each end which fingers are spaced, the last named side edge being spaced from the first named side edge whereby the thread may be first engaged with one finger and moved without interference into the free space between the fingers and in the space between the said two longitudinal side edges and then engaged with the other finger, the fingers extending across the space between said two longitudinal side edges.

In testimony whereof I have signed my name to this specification in the presence of two subscribing witnesses.

SUMNER A. DUDLEY.

Witnesses:
ADA E. HAGERTY,
J. A. MILLER.

Copies of this patent may be obtained for five cents each, by addressing the "Commissioner of Patents, Washington, D. C."